(12) United States Patent
Cavaliere et al.

(10) Patent No.: US 11,458,719 B2
(45) Date of Patent: Oct. 4, 2022

(54) METHOD FOR JOINING BY BONDING OF PARTS, IN PARTICULAR COMPOSITE PARTS HAVING FIBROUS REINFORCEMENT

(71) Applicants: AIRBUS (S.A.S.), Blagnac (FR); ArianeGroup S.A.S., Paris (FR)

(72) Inventors: Frederick Cavaliere, Montigny le Bretonneux (FR); Michel Bermudez, Suresnes (FR); Bruno Thomas, Paris (FR); Patrice Lefebure, Orvault (FR)

(73) Assignees: AIRBUS (S.A.S.), Blagnac (FR); ARIANEGROUP S.A.S., Paris (FR)

( * ) Notice: Subject to any disclaimer, the term of this patent is extended or adjusted under 35 U.S.C. 154(b) by 82 days.

(21) Appl. No.: 16/647,764

(22) PCT Filed: Jul. 16, 2018

(86) PCT No.: PCT/EP2018/069278
§ 371 (c)(1),
(2) Date: Mar. 16, 2020

(87) PCT Pub. No.: WO2019/016142
PCT Pub. Date: Jan. 24, 2019

(65) Prior Publication Data
US 2020/0406600 A1 Dec. 31, 2020

(30) Foreign Application Priority Data
Jul. 19, 2017 (FR) .................................... 1756850

(51) Int. Cl.
*B32B 37/18* (2006.01)
*B32B 7/12* (2006.01)
(Continued)

(52) U.S. Cl.
CPC .............. *B32B 37/185* (2013.01); *B32B 7/12* (2013.01); *B32B 27/08* (2013.01); *B32B 37/12* (2013.01);
(Continued)

(58) Field of Classification Search
CPC . B29C 65/02; B29C 65/4815; B29C 65/4835; B29C 65/5057; B29C 65/542;
(Continued)

(56) References Cited

U.S. PATENT DOCUMENTS 5,304,269 A * 4/1994 Jacaruso .................... C09J 5/06
156/94
5,643,390 A * 7/1997 Don ...................... B29C 66/712
156/313
(Continued)

FOREIGN PATENT DOCUMENTS

EP 0453784 A2 10/1991
WO 2014/189946 A1 11/2014

OTHER PUBLICATIONS

International Search Report for International Application No. PCT/EP2018/069278 dated Aug. 29, 2018.
(Continued)

*Primary Examiner* — Philip C Tucker
*Assistant Examiner* — Brian R Slawski
(74) *Attorney, Agent, or Firm* — Pearne & Gordon LLP

(57) ABSTRACT

A method for assembling two parts, referred to as first and second parts, the first part being produced from composite material with fibrous reinforcement embedded in a thermosetting or thermoplastic matrix, the method comprising the steps of: obtaining the first part comprising, on all or part of an outer surface, a first amorphous thermoplastic film; positioning the first part and the second part such that the first amorphous thermoplastic film is placed opposite the
(Continued)

second part; introducing a thermosetting resin between the first amorphous thermoplastic film and the second part; at least partially polymerising the thermosetting resin. When the two parts comprise an amorphous thermoplastic film, the parts are positioned such that the respective amorphous thermoplastic films are placed opposite each other, and the thermosetting resin is introduced between the amorphous thermoplastic films.

12 Claims, 2 Drawing Sheets

(51) Int. Cl.
  *B32B 27/08* (2006.01)
  *B32B 37/12* (2006.01)
  *B29C 65/00* (2006.01)
  *B29C 65/48* (2006.01)

(52) U.S. Cl.
  CPC ...... *B29C 65/4815* (2013.01); *B29C 65/4835* (2013.01); *B29C 66/1122* (2013.01); *B29C 66/303* (2013.01); *B29C 66/45* (2013.01); *B29C 66/721* (2013.01); *B29C 66/7392* (2013.01); *B29C 66/7394* (2013.01)

(58) Field of Classification Search
  CPC . B29C 66/112; B29C 66/1122; B29C 66/114; B29C 66/41; B29C 66/5346; B29C 66/71; B29C 66/712; B29C 66/721; B29C 66/7212; B29C 66/72141; B29C 66/7254; B29C 66/727; B29C 66/73772; B29C 66/73773; B29C 66/7392; B29C 66/73921; B29C 66/7394; B29C 66/919; B29C 66/929; B29C 66/48; B29C 66/303; B29L 2031/30; B29L 2031/3076; B29L 2031/3097; B32B 15/08; B32B 2250/40; B32B 2250/44; B32B 2255/02; B32B 2255/26; B32B 2260/023; B32B 2260/046; B32B 2262/0269; B32B 2262/101; B32B 2262/106; B32B 2307/702; B32B 2307/732; B32B 2605/08; B32B 2605/18; B32B 27/065; B32B 27/08; B32B 27/12; B32B 27/281; B32B 3/12; B32B 37/12; B32B 37/185; B32B 5/18; B32B 5/26; B32B 7/12; B32B 27/286; B32B 37/1207; B32B 37/1215; B32B 37/1223; B32B 37/144; C09J 5/04; C09J 5/06
  USPC ..... 156/60, 305, 306.6, 306.9, 307.1, 307.3, 156/307.4, 307.5, 308.2, 308.6, 309.6, 156/330, 330.9, 333
  See application file for complete search history.

(56) References Cited

U.S. PATENT DOCUMENTS

| 8,211,268 | B1 | 7/2012 | Raghavendran et al. |
| 2007/0222103 | A1* | 9/2007 | Paton .................... B29C 65/342 264/139 |
| 2017/0028698 | A1* | 2/2017 | Weiland ............ B29C 66/73752 |
| 2017/0044337 | A1* | 2/2017 | Van Tooren ........ B29C 37/0078 |

OTHER PUBLICATIONS

Preliminary French Search Report for French Patent Application No. 1756850.

\* cited by examiner

METHOD FOR JOINING BY BONDING OF PARTS, IN PARTICULAR COMPOSITE PARTS HAVING FIBROUS REINFORCEMENT

FIELD OF THE INVENTION

The present invention relates to the field of the joining of parts, in particular parts made of composite material. It relates more particularly to a method for joining parts made of thermoplastic and/or thermosetting composite material.

The invention is in particular suited to the creation of parts in the field of aeronautics, such as structural parts, parts that are large and/or of complex shape.

PRIOR ART

Composite materials with fibrous reinforcement, whether thermoplastic or thermosetting, are nowadays widely used for manufacturing parts in many industrial fields such as the fields of aeronautics or astronautics, including for structural parts, that is to say those which must withstand significant forces during use.

A composite material generally consists of a fibrous reinforcement and a matrix of thermosetting or thermoplastic resin, the marriage of which makes it possible to obtain a complex whose properties surpass those of the starting materials. Thus, parts made of composite material have numerous advantages connected in particular to their mechanical properties of strength and rigidity, low weight and ease of shaping.

Certain aircraft structural parts are created from individual parts then joined to one another. There are three joining methods:
  the mechanical joining method in which holes are created in the parts and the parts are joined to one another using fasteners;
  the bonding joining method in which the parts are joined by polymerizing an adhesive at the interface. Once polymerized, the connection is irreversible;
  the welding joining method in which the parts are joined by softening or melting the interface. The materials are softened or melted by heating. In contrast to polymerization, softening or melting is reversible.

For example, fuselage or wing panels consist of an assembly of a skin and stiffeners that are adhesively bonded, and are then joined to the other structural parts, of the frame or rib type, by means of fasteners. The two methods, mechanical joining and joining by bonding, are widely used in the field of aeronautics, and are often combined with one another for reasons of certification of the mechanical strength of the bond. By contrast, the method of joining by welding remains little used for structural applications despite the fact that this method has been the focus of much development work.

A person skilled in the art will be well aware of the various variants of the bonding method for joining two parts made of thermosetting composite material with fibrous reinforcement. Of particular note are:
  the method for bonding by co-curing; this consists in joining, by polymerization, two non-polymerized parts, the join between the two parts being created with or without an adhesive film;
  the method for bonding by co-bonding; this consists in joining, by polymerization, a non-polymerized part with a polymerized part, the join between the two parts being created with an adhesive film;
  the method for bonding by secondary bonding; this consists in joining, by bonding, two polymerized parts, the join between the two parts being created with an adhesive film.

The adhesive films used are preferably of the epoxy type.

These above-mentioned methods are very widely used for structural assemblies of composite parts and, while satisfactory, they each have numerous drawbacks. For the co-curing bonding method, the main drawback lies in complex implementation of the parts and tooling. For the methods for bonding by co-bonding and secondary bonding, the main drawbacks lie in the need to perform operations to prepare the surface of parts prior to joining, and in the sensitivity of the mechanical strength of the bond to surface contamination prior to bonding.

For joining two parts made of thermoplastic composite material with fibrous reinforcement, the bonding method is not used for structural applications principally due to insufficient mechanical strength of the bond, unless the thermoplastic parts have undergone complex and costly surface treatments such as plasma surface treatment.

The welding method is used for the structural joining of thermoplastic parts. The list includes, but is not limited to:
  welding by co-consolidation,
  ultrasonic welding,
  resistance welding,
  friction welding,
  induction welding,
  welding by softening an amorphous thermoplastic film on the surface of each of the thermoplastic parts, said amorphous thermoplastic film having a softening temperature below the processing temperature of the thermoplastic material of the parts that are to be joined.

Welding can be static, that is to say simultaneous welding of the entire interface between the two parts that are to be joined, or welding can be dynamic, that is to say progressive welding of the interface that is to be joined. These methods will be well known to a person skilled in the art.

For joining a thermoplastic part to a thermosetting part, just as with joining two thermoplastic parts, bonding is not used for structural applications principally due to insufficient mechanical strength of the bond, and/or the need for complex surface treatment for the thermoplastic part.

By contrast, joining a thermoplastic part to a thermosetting part can be carried out indirectly with a welding method using an amorphous thermoplastic film placed on the surface of the thermosetting part during polymerization of the latter. The connection with the thermoplastic part is established by the induction welding, ultrasonic welding or resistance welding method in order to heat the interface in a very localized manner and not degrade the thermosetting resin of the second part by excessive heating. However, this welding method, which is still in the developmental stage, is not used for structural applications.

There is therefore a need to propose a solution with which it is possible to establish bonds between two parts made of thermoplastic and/or thermosetting composite material, having good mechanical strength and reliability of the bond similar to that obtained with the co-curing bonding method, while having greater ease of implementation in order to reduce costs and while reducing recourse to surface preparation operations. There is also a need to propose a solution permitting bonding between a part made of thermoplastic or thermosetting composite material and a different part, such as a metal, a ceramic or other materials.

SUMMARY OF THE INVENTION

The present invention relates to a method for joining two parts, referred to as first and second parts, the first part being made of a composite material with fibrous reinforcement embedded in a thermosetting or thermoplastic matrix. The method comprising the steps of:

obtaining the first part, comprising a first amorphous thermoplastic film over all or part of an outer surface, positioning the first part and the second part such that the first amorphous thermoplastic film is placed facing the second part, introducing a thermosetting resin between the first amorphous thermoplastic film and the second part, at least partially polymerizing said thermosetting resin.

The amorphous thermoplastic resin of the films is preferably chosen on the basis of its solubility with the thermosetting resin during the phase of polymerization of the thermosetting resin, the thermosetting resin then acting as a solvent, and on the basis of the capacity of the thermoplastic and thermosetting materials to inter-diffuse in order to create an interphase.

Although the thermoplastic resin has already inter-diffused at the surface in contact with the first part, during creation of said first part, this thermoplastic resin can once again inter-diffuse at the opposite surface, which is in contact with the thermosetting resin, during the step of polymerization of the assembly.

The polymer chains of the thermosetting resin entangle, but without bonding, with the polymer chains of the amorphous thermoplastic film, until the thermosetting resin has completely polymerized.

The bond obtained between the thermoplastic and thermosetting resins is a polymerized bond and is therefore irreversible, contrary to the bonds obtained by welding.

The polymerized bond obtained has an interphase, this bond is consequently a strong bond having good mechanical strength.

Thus, the joining method according to the invention can be defined as a method for bonding by co-curing.

The joining method according to the invention most advantageously makes it possible to join a part made of thermosetting composite material, or a part made of thermoplastic composite material, comprising an amorphous thermoplastic film at its surface, to another part made of thermosetting composite material, or another part made of thermoplastic composite material, or indeed any part.

In other words, a method of this kind thus makes it possible to join, to one another, parts which are not usually joined by bonding, such as parts made of thermoplastic composite material.

The joining method according to the invention further makes it possible to dispense with the costly and complex operations for preparing the surface of the parts, in particular the parts made of thermoplastic composite material.

The joining method according to the invention also makes it possible to create structural assemblies, with parts of large size and/or of complex geometry, independently of the materials of which said parts are made.

According to preferred embodiments, the invention also has the following features, considered separately or in each of the technically functional combinations thereof.

In preferred embodiments, the step of introducing the thermosetting resin is done by inserting, between the first amorphous thermoplastic film and the second part, an adhesive film comprising a thermosetting resin.

In preferred embodiments, the thermosetting resin is introduced by injection. These embodiments are preferred principally when the parts are of large size and/or of complex geometry.

In preferred embodiments, the joining method comprises a step of introducing a permeable textile between the first amorphous thermoplastic film and the second part, prior to the step of introducing the thermosetting resin. These embodiments are preferred principally when the parts are of complex geometry, in order to maintain sufficient separation between the parts. This separation is also referred to as an air gap.

In preferred embodiments, the first amorphous thermoplastic film is chosen from among a polyetherimide (PEI), a polyethersulfone (PES), a polysulfone (PSU) and a polyvinylidene fluoride (PVDF).

In preferred embodiments, the introduced thermosetting resin is of the epoxy type.

In preferred embodiments, when the first part is a part comprising a first amorphous thermoplastic film over all or part of an outer surface, and the second part is a part comprising a second amorphous thermoplastic film over all or part of an outer surface, the two parts are positioned such that the first and second amorphous thermoplastic films are placed facing one another, and the thermosetting resin is introduced between the first and second amorphous thermoplastic films.

The invention also relates to a structural assembly obtained in accordance with the joining method in at least one of its embodiments.

The invention also relates to a method for assembling a sandwich panel comprising a core material between two skins, referred to as the first and second skin. Each skin is made of a composite material with fibrous reinforcement embedded in a thermosetting or thermoplastic matrix, comprising an amorphous thermoplastic film over all or part of an outer surface. The method comprises the steps of:

joining the first skin and the core material in accordance with the joining method as previously described in at least one of its embodiments, the first skin corresponding to the first part and the core material corresponding to the second part, joining the second skin and the core material in accordance with the joining method as previously described in at least one of its embodiments, the second skin corresponding to the first part and the core material corresponding to the second part.

The method for assembling the sandwich panel advantageously makes it possible to dispense with the surface preparation operations prior to bonding. This makes it possible, using this method, to create sandwich panels with skins made of thermoplastic composite material.

DESCRIPTION OF THE DRAWINGS

The invention will now be described more precisely in the context of particular embodiments, which are entirely non-limiting, shown in FIGS. 1 to 8, in which.

DESCRIPTION OF A PREFERRED EMBODIMENT

The exemplary embodiments are described in detail in their application to the field of aeronautics, in particular in the case of an aircraft part. This choice is non-limiting and can extend to other fields, in particular the field of astronautics or the automotive field.

The joining method according to the invention makes it possible to join two parts by bonding to form an assembly. The parts can be identical or be made of different materials.

At least one of the two parts is a part made of composite material having a fibrous reinforcement embedded in a thermosetting or thermoplastic matrix.

In the remainder of the description, the polymerized part 10 will refer to a part made of composite material having a fibrous reinforcement embedded in a thermosetting matrix.

The consolidated part 20 will refer to a part made of composite material having a fibrous reinforcement embedded in a thermoplastic matrix.

The polymerized part 10 or the consolidated part 20 further comprises an amorphous thermoplastic film 13, 23 over all or part of an outer surface 12, 22.

Figure 3:
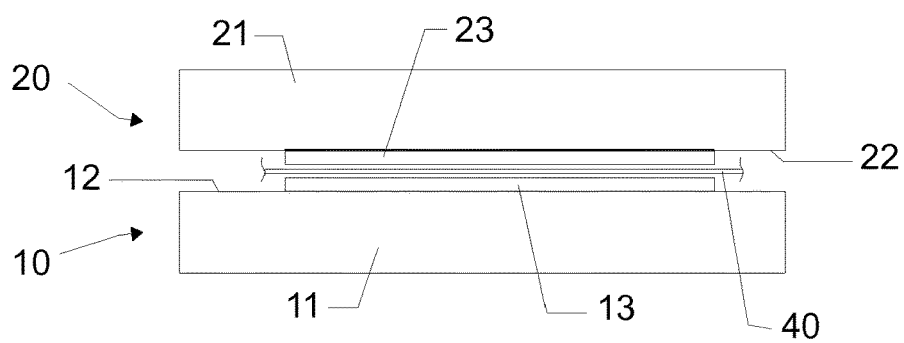
FIG. 3 shows, schematically, a step of positioning, with respect to one another, the two parts of FIG. 1 in the context of a method for joining said two parts.
Figure 4:
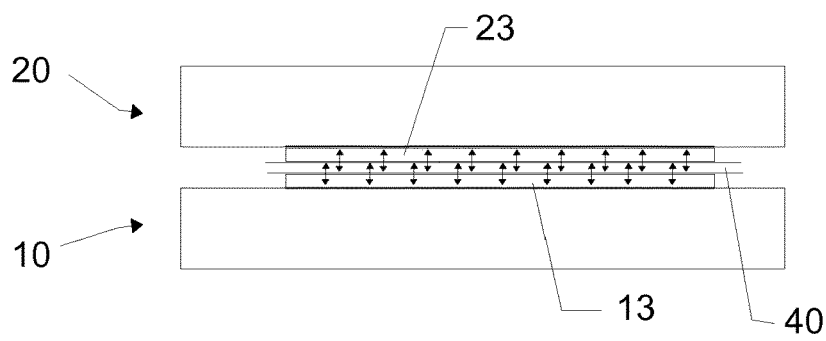
FIG. 4 shows, schematically, the step of polymerizing the two parts of FIG. 3 in the context of a joining method.
Figure 5:
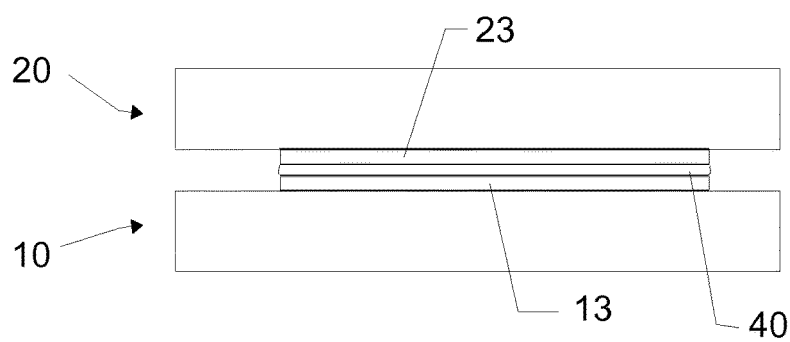
FIG. 5 shows, schematically, the assembly of the two parts after the polymerization step.

The rest of the description describes, in a non-limiting manner, the joining of a polymerized part 10 having an amorphous thermoplastic film 13 to a consolidated part 20 having an amorphous thermoplastic film 23, as shown in FIGS. 3 to 5.

In order to carry out the joining method according to the invention, a first step involves obtaining:
- a first part comprising a first amorphous thermoplastic film over all or part of an outer surface,
- a second part comprising a second amorphous thermoplastic film over all or part of the outer surface.

In the non-limiting example, the first part is a polymerized part 10 and the second part is a consolidated part 20.

This step may consist either in the creation of each part, or in the selection of a part from among parts previously created and stored with a view to their subsequent use.

The creation of one or other of the two parts is known per se and is reviewed below.

Creation of a Polymerized Part 10 with an Amorphous Thermoplastic Film 13

Figure 1:
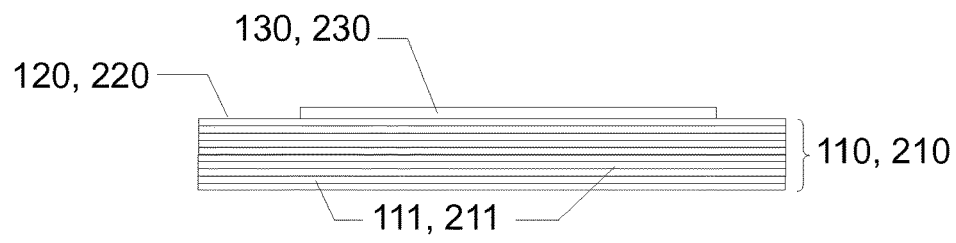
FIG. 1 shows, schematically, a step of laying up a part made of thermoplastic or thermosetting composite material and an amorphous thermoplastic film at the surface.
Figure 2:
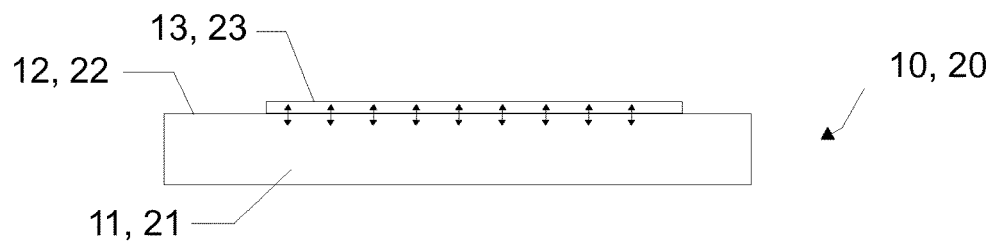
FIG. 2 shows, schematically, a step of polymerizing or consolidating the part of FIG. 1.

One exemplary embodiment of the creation of such a part 10 is described in a non-limiting manner and illustrated by FIGS. 1 and 2. In a first sub-step, a pre-impregnated preform 110 is created.

The preform 110 is defined such that the shape and the volume essentially correspond to the shape and dimensions of the final part that is to be created.

The preform 110 is for example created on a mould, the shape and the volume of which essentially correspond to the shape and dimensions of the part that is to be created.

The preform 110 is created by a single ply 111, or a superposition of at least two plies 111, of fibres pre-impregnated with a non-polymerized resin.

The nature and orientations of the fibres in the ply or plies are determined depending on the type of mechanical loads to which the final part will be subjected.

When the preform 110 is created by a superposition of plies 111, the number of plies and the orientations of the fibres in the successive plies are determined as part of known calculation techniques, which are not described here.

In one exemplary embodiment, the preform 110 comprises a superposition of pre-impregnated fibres, for example unidirectional sheets, made of carbon. The preform could also consist of glass fibres and/or Kevlar fibres.

The ply or plies 111 is/are pre-impregnated with a resin of the thermosetting type, for example an ester cyanate or phenolic or bismaleimide or epoxy resin.

In one exemplary embodiment, the ply or plies is/are impregnated with an epoxy resin whose base monomer is principally of the DGEBA (bisphenol A diglycidyl ether), TGPAP (triglycidyl-p-aminophenol) or TGMDA (tetraglycidyl methylenedianiline) type, and the hardening agent is of the amine type, such as diaminodiphenyl sulfone (DDS).

In a second sub-step, shown in FIG. 1, a layer 130 comprising an amorphous thermoplastic resin is deposited locally on the preform 110.

In an exemplary embodiment, the layer 130 is formed by a ply consisting of an amorphous thermoplastic resin.

The layer 130 is deposited locally on all or part of a surface 120 of an external ply of the preform 110, at a location at which the part, once created, is intended to be joined to another part, by bonding.

In another exemplary embodiment, the layer 130 is created by spraying fine particles of amorphous thermoplastic resin onto all or part of a surface of an external ply of the preform.

Whatever the exemplary embodiment for deposition of the layer, the amorphous thermoplastic resin is preferably a polyetherimide (PEI), a polyethersulfone (PES), a polysulfone (PSU) or a polyvinylidene fluoride (PVDF).

In a third sub-step, the preform-layer assembly is polymerized.

A vacuum bag and environmental products are put in place around the preform-layer assembly.

The vacuum bag is sealed using known means. A vacuum is then applied to the preform-layer assembly with the aim of compacting the preform-layer assembly, and in particular the plies. The preform-layer assembly then undergoes heat treatment, at a predetermined temperature and pressure and for a predetermined duration.

In the preferred example of the epoxy-type resin, the resin is a thermosetting polymer resin which is cross-linked at a temperature greater than or equal to 110° C.

The thermoplastic resin is chosen in particular depending on its amorphous character, on its solubility with the thermosetting resin during the polymerization phase of the thermosetting resin, the thermosetting resin then acting as a solvent for the amorphous thermoplastic, and on the capacity of the thermoplastic and thermosetting materials to inter-diffuse so as to create an interphase. This interphase consists of a gradual transition between the two materials that can include entanglement of the polymer chains of the two materials (this is then referred to as semi-inter-penetrating networks). In this zone, the two materials are intimately interwoven, thus creating a strong bond between the two materials. There is no continuity of the polymer chains between the two materials. In the exemplary embodiment, the polymerization step is carried out at a temperature of 180° C. Inter-diffusion takes place up to a temperature of approximately 175° C., then the interphase is fixed owing to the polymerization of the thermosetting resin.

During the polymerization step, the thermosetting resin contained in the preform spreads throughout the latter, filling the empty spaces between the fibres of the various plies. The layer, by contrast, does not become impregnated with the thermosetting resin of the preform since it is already impregnated with its own thermoplastic resin.

During the polymerization cycle, the viscosity of the resins of the layer and of the preform reduces with increasing temperature. Above a certain temperature, the thermosetting resin becomes a solvent for the amorphous thermoplastic resin. The polymer chains contained in the thermosetting resin of the preform will migrate into the layer and the polymer chains contained in the thermoplastic resin of the layer will migrate into the preform, as illustrated by the arrows in FIG. 2. Thus, what takes place is creation and inter-diffusion of the polymer chains of the thermosetting resin of the preform and of the thermoplastic resin of the layer.

After this third sub-step, the first part 10 is de-moulded. The first part 10 obtained comprises a polymerized structure 11 formed of an assembly of fibres held in a thermosetting resin and comprising, over all or part of an outer surface 12, a first amorphous thermoplastic film 13. After any operations for inspecting the integrity of the material, or for finishing for example for drilling or machining, the resulting polymerized part 10 can be joined by bonding to another part, as illustrated in FIGS. 3 to 5.

In one embodiment, sheets of unidirectional carbon fibres impregnated with the thermosetting epoxy resin M18, produced by HEXCEL®, are stacked one on top of another with the appropriate orientations of the fibres to form a laminate. A thermoplastic film, consisting of the PEI resin Ultem 1000 produced by SABIC® is placed on the surface of this laminate. The thickness of the film is between 50 μm and 250 μm. Advantageously, the PEI resin film undergoes no particular surface preparation if it has been stored and handled in the normal conditions of cleanliness, humidity and temperature known to a person skilled in the art. The assembly is then placed in a vacuum bag with the environmental products known to a person skilled in the art to ensure proper evacuation of the air and proper application of pressure during the polymerization cycle. A smoothing plate can be used on the surface of the part so as to ensure a good surface finish of the final part. The applied polymerization cycle is carried out at a temperature of 180° C. for two hours at a pressure of 7 bar. The PEI resin of the film has good compatibility with the M18 resin. The solubility of the PEI resin with the thermosetting epoxy resin M18 takes place from a temperature of approximately 110° C., the thermosetting epoxy resin M18 then becoming a solvent for the PEI resin. Good inter-diffusion of the two materials is observed up to a temperature of approximately 175° C. After polymerization and demoulding, the final part consists of a laminate of carbon and polymerized M18 epoxy, with a PEI thermoplastic film at the surface. The interphase zone has a thickness of approximately 50 μm.

After any operations for inspecting the integrity of the material, or for finishing for example for drilling or machining, the resulting polymerized part can be joined by bonding to another part.

Creation of a Consolidated Part 20 Having an Amorphous Thermoplastic Film

In the case of the creation of a consolidated part 20 with an amorphous thermoplastic film 23 over all or part of its outer surface 22, the two first sub-steps are identical, with the exception that the preform 210, created from at least one ply 211, is impregnated with a thermoplastic resin. FIGS. 1 and 2 can also represent sub-steps for the creation of a consolidated part 20. A layer 230, comprising an amorphous thermoplastic resin, is deposited locally over all or part of a surface 220 of an outer ply of the preform 210, at a location at which the part, once created, is intended to be joined to another part, by bonding.

The thermoplastic resin of the preform 210 is for example a polypropylene sulfone (PPS), polyaryl ether ketone (PAEK), polyether ketone ketone (PEKK) or polyether ether ketone (PEEK) resin. All of these resins are semi-crystalline thermoplastic resins.

The amorphous thermoplastic resin of the layer 230 is chosen such that its melting point is essentially equal to the melting point of the thermoplastic resin of the preform, and such that it has good inter-diffusion of the amorphous thermoplastic and thermoplastic materials at the processing temperature of the thermoplastic resin forming the laminate. It is also chosen such that it has good solubility with the thermosetting epoxy resin and good inter-diffusion during polymerization of the thermosetting resin during the joining operation. In the example of PEEK resin, the processing temperature is 400° C.

The third sub-step is a consolidation step. This consolidation step involves compacting the preform 210 with the amorphous thermoplastic film to the final form of the part by submitting it to a cycle of predetermined pressure and temperature.

The assembly stiffens on cooling, under pressure, to ambient temperature, at which it retains the shapes acquired during compacting.

At the end of this sub-step, the part 20 is de-moulded. The first obtained part 20 comprises a structure 21 which is consolidated and is formed of an assembly of fibres held in a thermoplastic resin and having, over all or part of an outer surface 22, a first amorphous thermoplastic film 23.

In one embodiment, sheets of unidirectional carbon fibres impregnated with the PEEK thermoplastic resin produced by VICTREX®, are stacked one on top of another with the appropriate orientations of the fibres to form a laminate. A thermoplastic film, consisting of the PEI resin Ultem 1000 produced by SABIC® is placed on the surface of this laminate. The thickness of the film is between 50 μm and 250 μm. Advantageously, the PEI resin film undergoes no particular surface preparation if it has been stored and handled in the normal conditions of cleanliness, humidity and temperature known to a person skilled in the art. The assembly is then placed in a vacuum bag with the environmental products known to a person skilled in the art to ensure proper evacuation of the air and proper application of pressure during the polymerization cycle. A smoothing plate can be used on the surface of the part so as to ensure a good surface finish of the final part. The applied consolidation cycle is carried out at a temperature of 400° C. for 20 minutes under a simple vacuum. The resin of the PEI film has good compatibility with the PEEK resin. The PEI resin melts at approximately 350° C. and the PEEK resin melts at 343° C. Good inter-diffusion of the two materials is obtained when the two materials are molten. After demoulding, the final part consists of a laminate of carbon and consolidated PEEK, with a PEI thermoplastic film at the surface. The interphase zone has a thickness of approximately 50 μm.

After any operations for inspecting the integrity of the material, or for finishing for example for drilling or machining, the resulting consolidated part can be joined by bonding to another part. In a second step of the joining method, the consolidated part 20 and the polymerized part 10 are positioned with respect to one another.

The consolidated part 20 and the polymerized part 10 are positioned such that the first amorphous thermoplastic film 13 of the polymerized part 10 is placed facing the second amorphous thermoplastic film 23 of the consolidated part 20.

The zone where the two amorphous thermoplastic films 13, 23 are placed facing one another is referred to as the bonding zone.

Then, in a third step of the joining method, a thermosetting resin is introduced between the first and second amorphous thermoplastic films 13, 23.

In one embodiment, the thermosetting resin is injected.

In one embodiment, the consolidated part 20 and the polymerized part 10 are placed, in advance, in a hermetically sealed enclosure.

The hermetically sealed enclosure is bounded, for example, by a mould-counter mould assembly, or a mould-vacuum bag assembly surrounding the preform-fibrous fabric assembly.

A thermosetting resin is then injected into the hermetically sealed enclosure bounded by the mould or the vacuum bag.

In one embodiment, the injected resin is a resin of the epoxy type, for example the resin HexFlow® RTM6 produced by HEXCEL®. Advantageously, this resin has very good compatibility with the PEI thermoplastic resin. In other words, the two materials have very good inter-diffusion during the cycle of polymerization of the RTM6 resin.

This embodiment is preferred when the parts to be joined are of large size and complex geometry.

In another implementation, as shown in FIG. 3, an adhesive film 40 is interposed in the bonding zone. Said adhesive film consists of a thermosetting resin. Said thermosetting adhesive may or may not have a substrate. A "substrate" is to be understood as meaning that the adhesive film may contain a fabric or mat of fibres by means of which said adhesive film can be handled and by means of which a minimum thickness of adhesive can be maintained during assembly.

In one embodiment, the adhesive film 40 is based on an epoxy-type resin, for example the film FM® 300 produced by CYTEC-SOLVAY Group®.

This embodiment is preferred when the parts are not of complex geometry, that is to say when the parts are essentially planar or have just a single radius of curvature at the bonding zone. Such a part may for example be an aircraft fuselage panel which has just a single radius of curvature and which is essentially planar in its length.

Such an embodiment makes it possible to simplify the joining method compared to the embodiment of introducing the resin by injection.

The polymerized part and the consolidated part 20 are then brought into contact under pressure in the bonding zone and are then confined in a hermetically sealed enclosure where, subsequently, the conditions necessary for polymerization will be established.

In a final step, the assembly is polymerized. During this step, the thermosetting resin and the thermoplastic resin of the amorphous thermoplastic films 13, 23 of each part 10, 20 inter-diffuse over a temperature range of generally between 110° and 175° C., which temperatures are close to the polymerization temperature of the thermosetting resin. This is made possible by the reversible character of thermoplastic resins. Indeed, the viscosity of a thermoplastic resin once again reduces when it undergoes another heating cycle.

Thus, although the thermoplastic resin has already inter-diffused at the surface in contact with the consolidated part 20, or at the surface in contact with the polymerized part 10, this resin may once again dissolve and inter-diffuse at the opposite surface which is in contact with the adhesive made of thermosetting resin, following the same process as described previously.

It is once again noted that the amorphous thermoplastic resin of the films 13, 23 has been chosen depending on its solubility with the introduced thermosetting resin, during the polymerization phase of the thermosetting resin, and on the capacity of the thermoplastic and thermosetting materials to inter-diffuse in order to create an interphase.

It is also again noted that, since the melting point of the thermoplastic resin of the consolidated part is much higher than the temperature necessary for polymerization of the thermosetting resin, only the thermoplastic resin of the amorphous thermoplastic films of the consolidated parts will inter-diffuse with the thermosetting resin during polymerization.

The polymer chains of the introduced thermosetting resin and of the amorphous thermoplastic films 13, 23 will therefore migrate and inter-diffuse, as illustrated by the arrows in FIG. 4.

In the interphase zone, these polymer chains of the introduced thermosetting resin mix and mingle with the polymer chains of the amorphous thermoplastic films 13, 23 of the polymerized part 10 and of the consolidated part 20, without however bonding with one another, until complete polymerization of the bonding zone.

This results in a completely polymerized bond between the polymerized part 10 and the consolidated part 20, with the creation of a strong bond in the interphase zones between said two parts.

In order to shorten the polymerization step and therefore the time for joining the two parts 10, 20, it can be envisaged to carry out a step of partial polymerization in place of total polymerization, then to carry out final polymerization outside the mould, for example in an oven with other assemblies.

In one exemplary embodiment, it is possible to envisage a partial polymerization step, with degrees of polymerization of the thermosetting resin of the order of 30 to 40%.

When the parts are of large size and/or complex geometry, the assembly method may comprise, prior to the step of introduction of the thermosetting resin, a step of introduction of a permeable textile (not shown), into the bonding zone, between the first and second amorphous thermoplastic films.

Indeed, the manufacture of the parts is generally carried out with tolerances of surface flatness. Thus, when said parts are positioned facing one another it is possible that the gap between these parts, referred to as the air gap, is not uniform. This means that the two parts can touch in the bonding zone.

In such a case, in order to maintain a minimum air gap width and to allow the resin to flow in the bonding zone during introduction thereof, a permeable textile is introduced between the two amorphous thermoplastic films, over all or part of the bonding zone.

In one exemplary embodiment, the permeable textile is a marquisette textile or even a voile textile.

Although the method has been described for joining a polymerized part 10 and a consolidated part 20, each comprising an amorphous thermoplastic film 13, 23, it is clear that the joining method according to the invention can also be used to join together:

two polymerized parts 10, each comprising an amorphous thermoplastic film 13, or two consolidated parts 20, each comprising an amorphous thermoplastic film 23.

Whatever the variant, the same steps apply.

The same advantages as those of a conventional co-curing bonding method are obtained, specifically:
- no operation for preparing the surface of the parts prior to joining,
- bond not subject to minor surface contamination prior to bonding,
- good mechanical strength owing to the interphase zones creating a strong bond between the thermosetting resin and the amorphous thermoplastic resin of the films.

In one preferred exemplary embodiment, the two parts, polymerized 10 and/or consolidated 20, that are to be joined are positioned in a closed tool of the mould-vacuum bag type, with their respective thermoplastic films placed facing one another. The two parts 10, 20 are advantageously positioned in the mould with no surface preparation prior to placement in the mould. A minimum clearance between the two parts is ensured by placing, over all or part of the interfaces, a thin textile having high permeability to the injection resin. The thermosetting resin is injected into the interfaces by means of the RTM (resin transfer moulding) method. The RTM6 resin is injected at a temperature below 110° C. After injection, polymerization takes place at 180° C. for 2 h. After the end of the polymerization cycle, the assembly is de-moulded.

Figure 6:
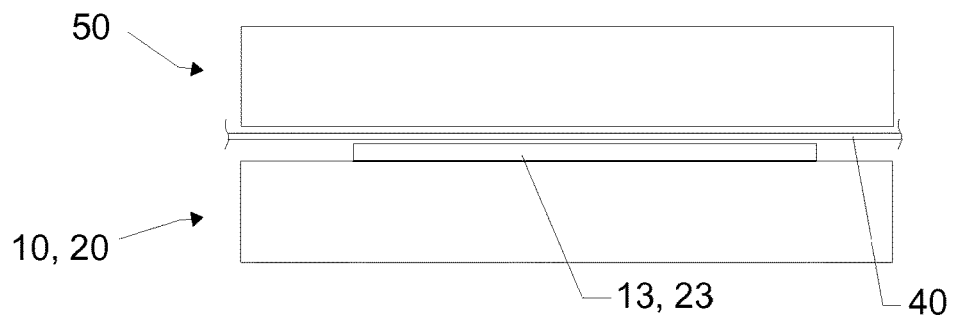
FIG. 6 shows, schematically, a step of positioning the part of FIG. 1 and another part comprising no amorphous thermoplastic film, in the context of a method for joining said two parts.
Figure 7:
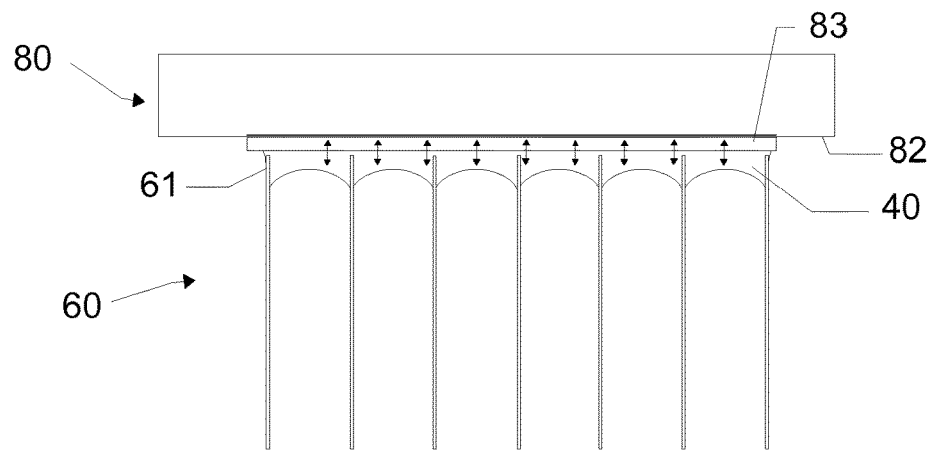
FIG. 7 shows, schematically, a step of polymerizing the part of FIG. 1 and a core material having a cellular structure in order to create a sandwich panel.
Figure 8:
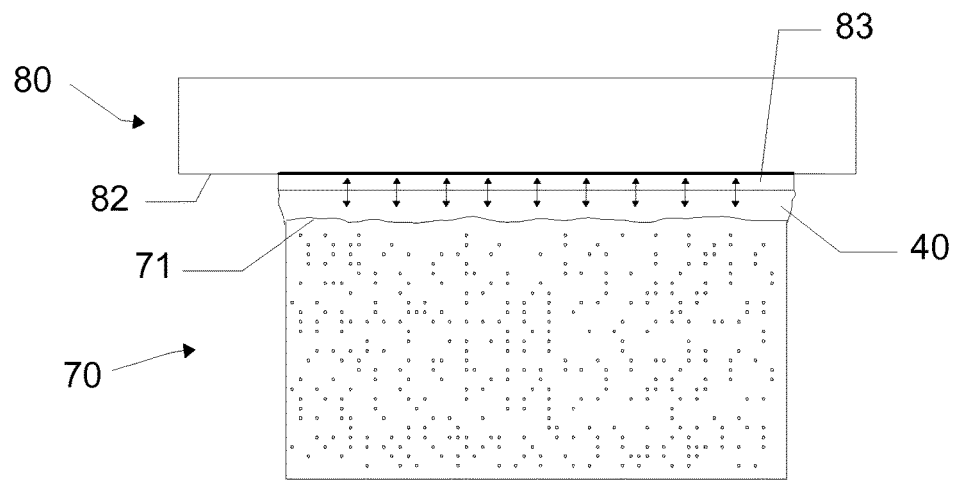
FIG. 8 shows, schematically, a step of polymerizing the part of FIG. 1 and a core material in the form of a foam in order to create a sandwich panel.

The joining method according to the invention also makes it possible to join a first part, polymerized 10 or consolidated 20 comprising an amorphous thermoplastic film 13, 23 at the surface, to a second part 50, 60, 70 comprising no amorphous thermoplastic film at the surface, which may be but is not limited to: a polymerized or partially polymerized part, a dry fibrous preform, a consolidated part or even a metal part, as shown in FIGS. 6 to 8.

In this case, during the positioning step, as shown in FIG. 6, the polymerized part 10 or consolidated part 20 having an amorphous thermoplastic film 13, 23 at the surface, is placed facing the second part 50 with no amorphous thermoplastic film at the surface, at the place where the join is to be made.

The thermosetting resin is preferably introduced in the form of an adhesive film, as described previously.

In the case of assembly with a part 50 in the form of a dry fibrous preform, the thermosetting resin is introduced by injection. The resin then spreads at the interface but also in the dry preform.

The step of polymerization, whether total or partial, is identical to that described previously.

During the polymerization step, at the interface on the side of the polymerized part 10 or consolidated part 20, the materials of the thermosetting adhesive film and of the thermoplastic film will inter-diffuse during polymerization of the thermosetting adhesive film, as described previously. At the interface on the side of the second part 50, during the polymerization cycle, the thermosetting adhesive film will spread over the second part 50. Bonding is bonding by co-curing (for example a partially polymerized part or an injected dry fibrous preform), or bonding by co-bonding (for example a metal or consolidated or polymerized part).

A joining method of this kind (joining a polymerized or consolidated part comprising an amorphous thermoplastic film on its surface to any other part not comprising an amorphous thermoplastic film on its surface) is advantageously applicable to assembling a sandwich panel.

A sandwich panel made of composite material comprises a core material adhesively bonded to two skins 80 made of composite material.

The core material may for example be of the type having a cellular structure 60, for example a honeycomb-type structure, often referred to as Nida, or of the foam type 70.

Each skin 80 may be made of composite material having a fibrous reinforcement embedded in a thermoplastic or thermosetting matrix.

A sandwich panel of this kind can easily be assembled with the joining method according to the invention.

In this case, each skin 80, whether consolidated or polymerized, is created beforehand with an amorphous thermoplastic film 83 over all or part of an outer surface 82, in this case that surface which will be in contact with the core material.

FIGS. 7 and 8 show only the join between one skin 80 and the core material, the join between the other skin and the core material being identical. FIG. 7 shows the join between a skin 80 and a core material having a cellular structure 60. FIG. 8 shows the join between a skin 80 and a core material of the foam type 70.

Each skin 80 is then positioned such that each amorphous thermoplastic film 83 is placed facing the core material.

The resin is preferably introduced, between each amorphous thermoplastic film 83 and the core material, in the form of an adhesive film 40, with or without a substrate, as described previously.

The polymerization step, whether total or partial, is identical to that described previously.

During the polymerization step, at each interface on the skin side, the materials of the thermosetting adhesive film and of the thermoplastic film will inter-diffuse during polymerization of the thermosetting adhesive film, as described previously.

At each interface on the foam side, during the polymerization cycle, the thermosetting adhesive film will spread over all or part of an outer surface 71 of foam 70, as shown in FIG. 8.

At each interface on the Nida side, during the polymerization cycle, the thermosetting adhesive film will spread over the ends of the vertical walls 61 of the cells of the Nida, forming menisci of which the concavity is oriented towards the skin, as shown in FIG. 7. The bonding is bonding by co-bonding. In order to reduce assembly time, joining of the two skins 80 to the core material is preferably carried out simultaneously. Contrary to the existing bonding methods, which require complex and costly surface preparation operations, in particular for skins made of thermoplastic composite (plasma treatment), the method according to the invention advantageously makes it possible to dispense with the surface preparation operations prior to bonding to create sandwich panels having skins made of thermoplastic composite material.

The above description shows clearly that, by virtue of its various features and their advantages, the present invention meets its objectives. In particular, it proposes a method for joining, to one another, parts made of thermoplastic composite material and/or parts made of thermosetting composite material and/or any parts, and having good mechanical strength of the bonds. Thus, it makes it possible to create structural assemblies with parts of large size and/or complex geometry, independently of the materials of which the parts are made.

The invention claimed is:

1. A method for assembling a sandwich panel comprising a core material between two skins, referred to as first and second skins, each skin being made of a composite material with fibrous reinforcement embedded in a cured thermosetting or thermoplastic matrix and comprising an amorphous thermoplastic film over all or part of an outer surface, said method comprising the steps of:
- joining the first skin with the core material by;
  - positioning the first skin and the core material such that the amorphous thermoplastic film of the first skin is placed facing a first outer surface of the core material;
  - introducing a first uncured thermosetting resin between the amorphous thermoplastic film of the first skin and the first outer surface of the core material; and
  - curing the first uncured thermosetting resin so that a first interpenetrating network is created between the amorphous thermoplastic film of the first skin and the first cured thermosetting resin;
- joining the second skin with the core material by;
  - positioning the second skin and the core material such that the amorphous thermoplastic film of the second skin is placed facing a second outer surface of the core material opposite to the first outer surface of the core material;
  - introducing a second uncured thermosetting resin between the amorphous thermoplastic film of the second skin and the second outer surface of the core material; and
  - curing the second uncured thermosetting resin so that a second interpenetrating network is created between the amorphous thermoplastic film of the second skin and the second cured thermosetting resin.

2. The method of claim 1, in which the steps of introducing the first and second uncured thermosetting resins comprise injection of the first and second uncured thermosetting resins.

3. The method of claim 2, comprising a step of introducing a first permeable textile between the amorphous thermoplastic film of the first skin and the core material, prior to the step of introducing the first uncured thermosetting resin and a step of introducing a second permeable textile between the amorphous thermoplastic film of the second skin and the core material, prior to the step of introducing the second uncured thermosetting resin.

4. The method of claim 1, in which the steps of introducing the first uncured thermosetting resin and the second uncured thermosetting resin comprise an insertion of a first adhesive film comprising the first uncured thermosetting resin between the amorphous thermoplastic film of the first skin and the first outer surface of the core material, and of a second adhesive film comprising the second uncured thermosetting resin between the amorphous thermoplastic film of the second skin and the second outer surface of the core material.

5. The method of claim 1, in which the amorphous thermoplastic film of the first skin and the second skin is a polyetherimide film, a polyethersulfone film, a polysulfone film or a polyvinylidene fluoride film.

6. The method of claim 1, in which the first uncured thermosetting resin and the second uncured thermosetting resin are epoxy resins.

7. The method of claim 1, in which the core material has a honeycomb structure or a foam structure.

8. A method for assembling a sandwich panel comprising a core material between two skins, referred to as a first skin and a second skin, each skin being made of a composite material with fibrous reinforcement embedded in a cured thermosetting or thermoplastic matrix and comprising an amorphous thermoplastic film over all or part of an outer surface, said method comprising the steps of:
- positioning the first skin and the core material such that the amorphous thermoplastic film of the first skin is placed facing a first outer surface of the core material;
- introducing a first uncured thermosetting resin between the amorphous thermoplastic film of the first skin and the first outer surface of the core material;
- positioning the second skin and the core material such that the amorphous thermoplastic film of the second skin is placed facing a second outer surface of the core material opposite to the first outer surface of the core material;
- introducing a second uncured thermosetting resin between the amorphous thermoplastic film of the second skin and the second outer surface of the core material;
- curing the first uncured thermosetting resin and the second uncured thermosetting resin so that a first interpenetrating network is created between the amorphous thermoplastic film of the first skin and the first cured thermosetting resin and a second interpenetrating network is created between the amorphous thermoplastic film of the second skin and the second cured thermosetting resin.

9. The method of claim 8, in which the steps of introducing the first uncured thermosetting resin and the second uncured thermosetting resin comprises an insertion of a first adhesive film comprising the first uncured thermosetting resin between the amorphous thermoplastic film of the first skin and the first outer surface of the core material, and of a second adhesive film comprising the second uncured thermosetting resin between the amorphous thermoplastic film of the second skin and the second outer surface of the core material.

10. The method of claim 8, in which the amorphous thermoplastic film of the first skin and the second skin is a polyetherimide film, a polyethersulfone film, a polysulfone film or a polyvinylidene fluoride film.

11. The method of claim 8, in which the first uncured thermosetting resin and the second uncured thermosetting resin are epoxy resins.

12. The method of claim 8, in which the core material has a honeycomb structure or a foam structure.

* * * * *